(12) United States Patent
Tiesler et al.

(10) Patent No.: US 6,957,841 B1
(45) Date of Patent: Oct. 25, 2005

(54) EXPANDED POLYPROPYLENE SUN VISOR ASSEMBLY

(75) Inventors: John M. Tiesler, Harrison Township, MI (US); Michael C. Dykman, Lake Orion, MI (US); James R. Mestemaker, Lambertville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/709,170

(22) Filed: Apr. 19, 2004

(51) Int. Cl.[7] ................................................. B60J 3/02

(52) U.S. Cl. ................................. 296/97.12; 296/97.9

(58) Field of Search ........................... 296/97.9, 97.12, 296/97.13

(56) References Cited

U.S. PATENT DOCUMENTS

| | | | | |
|---|---|---|---|---|
| 5,727,837 | A | | 3/1998 | Viertel ........................ 296/97.1 |
| 5,975,616 | A | | 11/1999 | Eple et al. .................. 296/97.1 |
| 6,619,718 | B1 | * | 9/2003 | Tiesler ........................ 296/97.1 |
| 6,637,799 | B1 | * | 10/2003 | Tiesler ........................ 296/97.1 |
| 6,676,129 | B2 | * | 1/2004 | Wilson ........................ 296/97.9 |
| 6,682,121 | B1 | | 1/2004 | Conforti ..................... 296/97.5 |
| 2001/0024048 | A1 | | 9/2001 | Hobson et al. ............. 296/97.1 |

* cited by examiner

*Primary Examiner*—Dennis H. Pedder
(74) *Attorney, Agent, or Firm*—Bruce E Harang

(57) ABSTRACT

The present invention provides an expanded polypropylene over-mold blade sun visor carrier assembly incorporating an electrical distribution system therein in cooperative combination with a center support assembly containing a corresponding electrical distribution system and a support shaft.

16 Claims, 3 Drawing Sheets

EXPANDED POLYPROPYLENE SUN VISOR ASSEMBLY

BACKGROUND OF INVENTION

1. Field of the Invention

The present invention generally relates to a sun visor for vehicles having a sun visor body supported by a sun visor shaft and a sun visor center support. More particularly the present invention relates to a sun visor for vehicles comprising a sun visor carrier containing an electric current distribution means over-molded with an expanded polypropylene plastic over-mold, sun visor body.

2. Description of the Related Art

Vehicle sun visors comprising a sun visor body or blade, a sun visor bent shaft, and a center support are well known and are described in numerous publications and have been in extensive use. Newer but also known are sun visors produced by over-molding a sun visor carrier with expanded polypropylene or similar materials. However, no such over-molded sun visors provide an integral electric current distribution system allowing for vanity lamps and the like mounted on or in such sun visors without the need for assembly line wiring of such vanity lamps and the like.

For example, U.S. Pat. No. 6,682,121 issued Jan. 27, 2004 to Conforti teaches a sunscreen suitable for mounting directly onto the glass surface of a side or rear vehicle window to reduce the light transmission into the vehicle passenger compartment.

U.S. Pat. No. 5,975,616 issued Nov. 2, 1999 to Eple et al teaches a molded sun visor which does not require a separate visor covering but which provides no means of providing electrical power for items such as vanity lights mounted on or in said sun visor.

U.S. Pat. No. 5,727,837 issued Mar. 17, 1998 to Viertel teaches a sun visor utilizing a carrier insert with plastic over molding without the need for a fabric cover. In one embodiment a micro-switch is taught for activating and deactivating electrical power to vanity lights.

U.S. Patent Application Publication 2001/0024048 published Sep. 27, 2001 to Hobson et al teaches a clamshell type sun visor body covered with a fabric.

European Patent Application WO 93/08038 published Sep. 29, 1993 to Industrias Techno-Matic, S.A. teaches single piece hollow bodied sun visor which may have its hollow core filled with sound insulating material.

DISCLOSURE OF THE INVENTION

The present invention provides advantages and alternatives over the prior art by providing an expanded polypropylene over-mold blade sun visor carrier assembly incorporating an electrical distribution system therein in cooperative combination with a center support assembly containing a corresponding electrical distribution system and a support shaft.

According to a further aspect of the present invention, provides for the pre-assembly of the electrical system necessary to provide power to vanity lamps and the like while reducing the assembly time and assembly complexity of the vehicle interior on the assembly line.

According to yet another aspect of the present invention provides for a sun visor having a thin profile that does not require the application of a fabric cover, and eliminates the requirement of providing a separate electrical wiring system to power vanity lamps and the like.

According to a yet further aspect of the present invention there is provided a sun visor carrier assembly for use as a core for an over-molded expanded polypropylene sun visor suitable for use in vehicles comprising in cooperative combination: a) a sun visor carrier body comprising; a blade section having located therein a vanity assembly mounting device, and a rod mounting section having a bore there through for mounting on a sun visor rod said bore being dimensionally maintained by a plurality of fasteners; b) a pair electrical connection wires providing electrical current to a vanity assembly; c) a detent dip attached to said sun visor carrier body with a detent dip fastener device; d) a cylindrical detent sleeve having a flat face portion, a cylindrical rod end bushing, and a cylindrical center support pin assembly comprising a body having molded therein a spaced apart pair of electrical contact surfaces, said electrical contact surfaces electrically connected said electrical connection wire of component b); all mounted within said bore of said carrier body; e) a sun visor rod support having a flat face and mounted within said cylindrical detent sleeve such that the flat faces of each are aligned, and said cylindrical rod end bushing; f) a covering tape over the assembled rod mounting section to prevent plastic migration during over-molding of the carrier body; and f) a center support assembly comprising a body having a assembly mounting bore, a pair of electrical contact clips wherein each electrical contact clip is connected to the vehicles power system by means of an electrical wire attached thereto; thereby providing a sun visor carrier body assembly with cooperating sun visor rod and sun visor center support assembly allowing for over-molding with a plastic to produce a finished sun visor having electrical provision for a vanity assembly incorporating electrical components.

According to still another aspect of the present invention there is presented a sun visor carrier assembly for use as a core for an over-molded expanded polypropylene sun visor suitable for use in vehicles comprising in cooperative combination: a) a sun visor carrier body comprising; a blade section having located therein a vanity assembly mounting device, and a rod mounting section having a bore there through for mounting on a sun visor rod said bore being dimensionally maintained by a plurality of fasteners; b) an electrical connection wire providing electrical current to a vanity assembly; c) a detent clip attached to said sun visor carrier body with a detent clip fastener device; d) a cylindrical detent sleeve having a flat face portion, a cylindrical rod end bushing, and a cylindrical center support pin assembly comprising a body having molded therein a spaced apart pair of electrical contact surfaces, one electrical contact surface electrically connected said electrical connection wire of component b) and the other electrical contact surface connected to carrier body, all mounted within said bore of said carrier body; e) a sun visor rod support having a flat face and mounted within said cylindrical detent sleeve such that the flat faces of each are aligned, and said cylindrical rod end bushing; f) a covering tape over the assembled rod mounting section to prevent plastic migration during over-molding of the carrier body; and f) a center support assembly comprising a body having a assembly mounting bore, a pair of electrical contact clips wherein each electrical contact clip is connected to the vehicles power system by means of an electrical wire attached thereto; thereby providing a sun visor carrier body assembly with cooperating sun visor rod and sun visor center support assembly allowing for over-molding with a plastic to produce a finished sun visor having electrical provision for a vanity assembly incorporating electrical components.

The present invention thus advantageously provides a low cost, attractive sun visor assembly that reduces the cost of final assembly in the vehicle.

DETAILED DESCRIPTION

Figure 1:
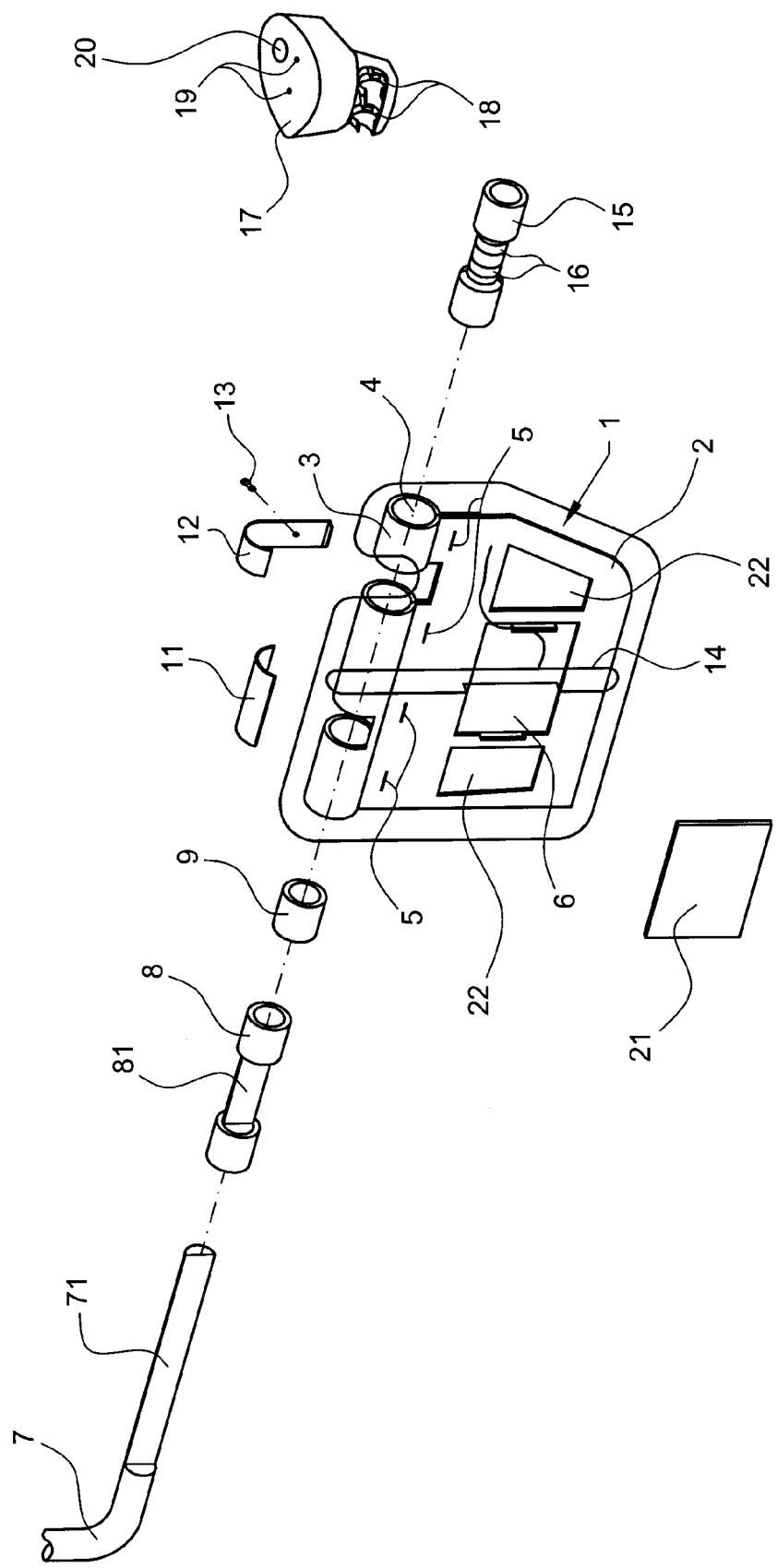
FIG. 1 shows an exploded perspective view of one preferred embodiment of the present invention including the sun visor carrier assembly having a plurality of fastening devices, the support shaft, and the center support assembly.

Reference will now be made to the drawings, wherein to the extent possible like reference numerals are utilized to designate like components throughout the various views. Referring to FIG. 1, there is presented a perspective exploded view of a preferred embodiment of the present invention comprising a sun visor carrier or support body 1 preferably comprising formed sheet metal having a blade section 2 and a rod mounting section 3. The blade section 2 having located therein a vanity assembly attachment device 6 adapted to mount a vanity assembly 21 therein, as well as an electrical connection wire 14 which connects to one of electrical wires 30 (FIG. 3), and optionally openings 22 to reduce the weight of the carrier body 1. The mounting section 3 having a bore 4 there through for mounting an elbow rod assembly comprising an elbow rod 7, having a flat face 71, and also having mounted thereon a detent sleeve 8, a rod end bushing 9 to provide stability for elbow rod 7, and a center support pin assembly 15. The center support pin assembly 15 being fixedly mounted within bore 4, and having located on a portion of its outer surface a pair of electrical contact surfaces 16 connected to a pair of electrical wires 30 (FIG. 3), one of said pair of electrical wires 30 being connected as the hot lead to electrical wire 14 and the other being connected as a ground to blade section 2. A plurality of staples 5, or other suitable fasteners, is used to provide a desired dimensional diameter of bore 4 and to retain the center support pin assembly 15 within said bore 4. The rod mounting section 3 may have the end mounting the center support pin assembly 15 crimped to assist fixedly securing said center support pin assembly 15 within bore 4. Detent sleeve 8 having a flat surface 81 thereon. The flat surfaces 81 and 71 providing both rotational and detent features to the sun visor rod 7. A detent clip 12 is fastened to support 1 with a rivet fastening device 13. It is to be understood that fastening devices 5 and 13 may be selected from any of the well-known fastening devices suitable for these purposes. The vanity assembly 21 is adapted to mount in mount 6 of blade section 2 of sun visor carrier body 1 and electrically connect to a vehicle's power supply via electrical wire 14, center support pin assembly 15, and center support assembly 17.

As further shown in FIG. 1 is a center support assembly 17 having provided therein a pair of contact clips 18, a pair of corresponding electrical wire leads 19 connected to said contact clips 18, and a bore 20 for mounting said center support assembly to the vehicle by known fastening devices suitable for this purpose. Finally there is shown a portion of the tape 11 which covers the completed carrier body 1 to prevent plastic migration into the bore 4 during the over-molding of the sun visor body (shown here in phantom).

Figure 2:
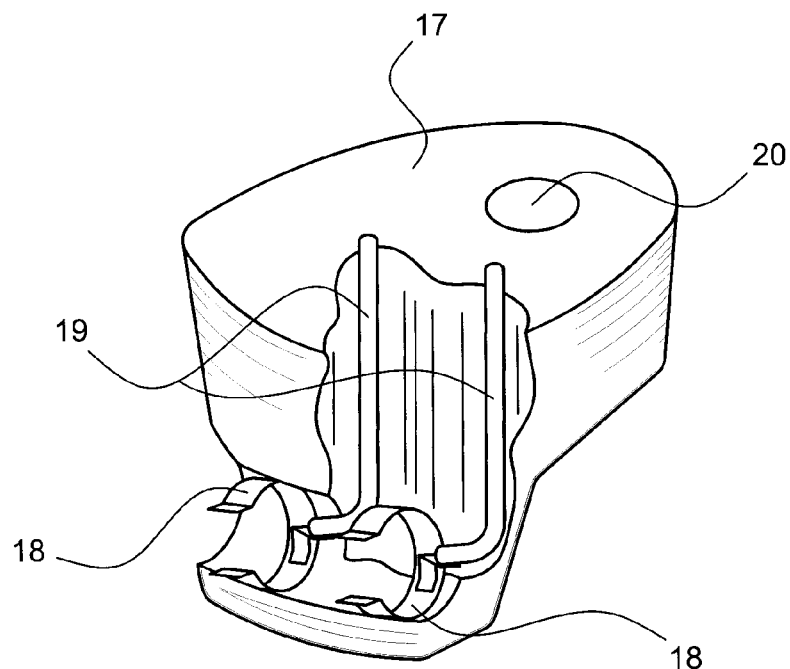
FIG. 2 shows a perspective view with a partial section of the center support assembly of the present invention shown in FIG. 1.

Referring now to FIG. 2, there is shown a perspective view with a partial section of the center support assembly 17 of FIG. 1 having a mounting bore 20 and showing the pair of electrical wires 19 electrically connected to a pair of contact clips 18.

Figure 3:
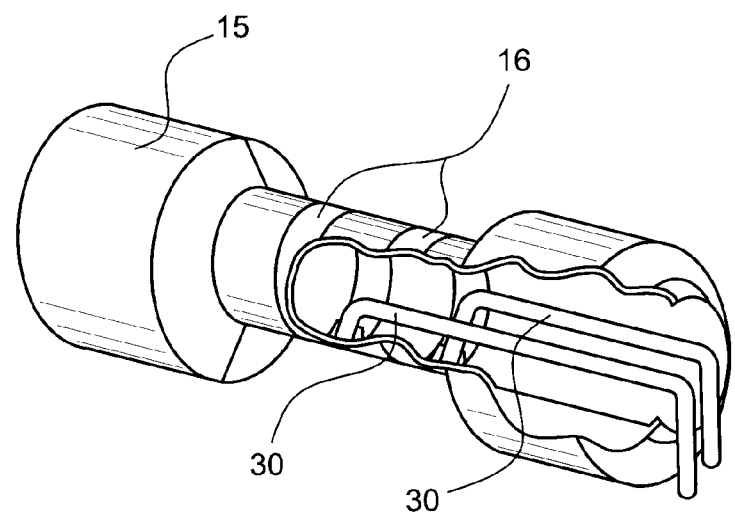
FIG. 3 shows a perspective view with a partial section of the center support pin assembly of the present invention shown in FIG. 1.
Figure 4:
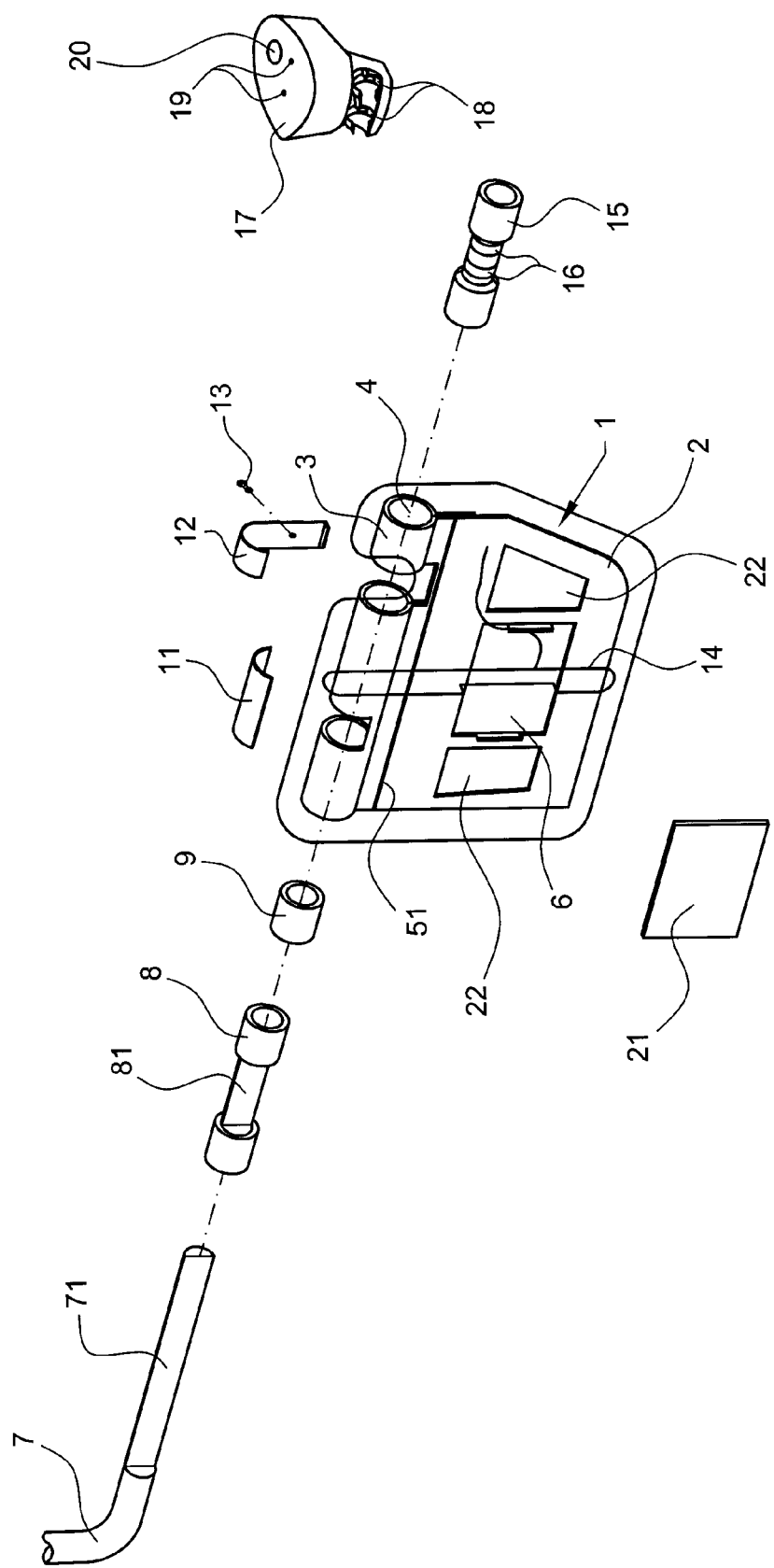
FIG. 4 shows an exploded perspective view of a second preferred embodiment of the present invention including the sun visor carrier assembly having a welded fastening, the support shaft, and the center support assembly.

Turning now to FIG. 3, there is shown a perspective view with a partial section of the center support pin assembly 15 of FIG. 1 having a pair of electrical contact support surfaces 16, each of said pair of electrical contact support surfaces 16 connected to an electrical wire 30.

The OLE_LINK1 center support assembly 17 OLE_LINK1 and center support pin assembly 15 are made of electrically non-conductive material, preferably plastic, and most preferably expanded polypropylene.

In practice of one preferred embodiment, the carrier body 1 is formed with the appropriate vanity assembly mount 6 and optionally weight reduction openings 22 formed in blade section 2 and rod mounting section 3 is stapled with a plurality of staples 5, detent 12 is fastened to carrier body 1 preferably using a rivet 13, and electrical wire 14 is installed. Then detent sleeve 8, rod end bushing 9, and center support pin assembly 15 are mounted in bore 4 and secured in place. Electrical wire 14 is connected to one of electrical wires 30. A piece of tape 11 is then positioned to cover the openings in the rod mounting section of carrier body 1 to prevent plastic migration during the over-molding process. Next the over-molded sun visor body of expanded polypropylene is molded over the assembled carrier body 1. An appropriate vanity assembly 21 is then mounted in the sun visor using vanity assembly mount 6. Finally the elbow rod 7 is mounted within the detent sleeve 8, and rod end bushing 9. During assembly of the sun visor in a vehicle the elbow rod 7 is mounted by known means to the vehicle roof. The center support assembly 17 is also mounted by known means in an appropriate location in the vehicle to accept the sun visor of the present invention.

In practice of a second preferred embodiment, the carrier body 1 is formed with the appropriate vanity assembly mount 6 and optionally weight reduction openings 22 formed in blade section 2 and rod mounting section 3 is welded as shown by weld bead 51, detent 12 is fastened to carrier body 1 preferably using a rivet 13, and electrical wire 14 is installed. Then detent sleeve 8, rod end bushing 9, and center support pin assembly 15 are mounted in bore 4 and secured in place. Electrical wire 14 is connected to one of electrical wires 30. A piece of tape 11 is then positioned to cover the openings in the rod mounting section of carrier body 1 to prevent plastic migration during the over-molding process. Next the over-molded sun visor body of expanded polypropylene is molded over the assembled carrier body 1. An appropriate vanity assembly 21 is then mounted in the sun visor using vanity assembly mount 6. Finally the elbow rod 7 is mounted within the detent sleeve 8, and rod end bushing 9. During assembly of the sun visor in a vehicle the elbow rod 7 is mounted by known means to the vehicle roof. The center support assembly 17 is also mounted by known means in an appropriate location in the vehicle to accept the sun visor of the present invention.

It is presently preferred to use heat welding to secure rod mounting section 3 when carrier 2 comprises plastic, it is to be further understood that the weld may be a single continuous weld or a plurality of spot welds. In another presently preferred embodiment it is preferred to use a plurality of staples 5 to secure rod mounting section 3 when carrier 2 comprises metal.

Although the preferred embodiments of the present invention has been disclosed, various changes and modifications may be made without departing from the scope of the invention as set forth in the appended claims.

What is claimed is:

1. A sun visor carrier assembly, rod, and center support for use as a core for an over-molded expanded polypropylene sun visor suitable for use in vehicles comprising in cooperative combination:
   a) a sun visor carrier body comprising: a blade section having located therein a vanity assembly mounting device, and a rod mounting section having a bore there through for mounting on a sun visor rod, said bore being dimensionally maintained by at least one fastener;
   b) a pair of electrical connection wires providing electrical current to a vanity assembly;
   c) a detent clip attached to said sun visor carrier body with a detent clip fastener device;
   d) a cylindrical detent sleeve having a flat face portion, a cylindrical rod end bushing, and a cylindrical center support pin assembly comprising a body having molded therein a spaced apart pair of electrical contact surfaces, said electrical contact surfaces electrically connected to said electrical connection wire of b); mounted said sleeve, end bushing, and pin assembly are within said bore of said carrier body;
   e) a sun visor rod having a flat face mounted within said cylindrical detent sleeve and said cylindrical rod end bushing;
   f) a covering tape over the assembled rod mounting section to prevent plastic migration during over-molding of the carrier body; and
   g) a center support assembly comprising a body having an assembly mounting bore, a pair of electrical contact clips wherein each electrical contact clip is connected to the vehicles power system by means of an electrical wire attached thereto;

thereby providing a sun visor carrier body assembly with cooperating sun visor rod and sun visor center support assembly allowing for over-molding with a plastic to produce a finished sun visor having electrical provision for a vanity assembly incorporating electrical components.

2. The sun visor carrier assembly, rod, and center support as claimed in claim 1 wherein, said sun visor carrier body comprises metal.

3. The sun visor carrier assembly, rod, and center support as claimed in claim 1 wherein, said sun visor carrier body comprises plastic.

4. The sun visor carrier assembly, rod, and center support as claimed in claim 1 wherein, said detent clip comprises a metal.

5. The sun visor carrier assembly, rod, and center support as claimed in claim 1 wherein, said detent clip fastener device is a rivet.

6. The sun visor carrier assembly, rod, and center support as claimed in claim 1 wherein, said cylindrical detent sleeve, said rod end busing, said center support pin assembly body and said center support assembly body comprise a plastic.

7. The sun visor carrier assembly, rod, and center support as claimed in claim 1 wherein, said at least one fastener is a plurality of staples.

8. The sun visor carrier assembly, rod, and center support as claimed in claim 1 wherein, said at least one fastener is at least one sonic weld.

9. A sun visor carrier assembly, rod, and center support for use as a core for an over-molded expanded polypropylene sun visor suitable for use in vehicles comprising in cooperative combination:
   a) a sun visor carrier body comprising: a blade section having located therein a vanity assembly mounting device, and a rod mounting section having a bore there through for mounting on a sun visor rod, said bore being dimensionally maintained by at least one fastener;
   b) an electrical connection wire providing electrical current to a vanity assembly;
   c) a detent clip attached to said sun visor carrier body with a detent clip fastener device;
   d) a cylindrical detent sleeve having a flat face portion, a cylindrical rod end bushing, and a cylindrical center support pin assembly comprising a body having molded therein a spaced apart pair of electrical contact surfaces, one electrical contact surface electrically connected to said electrical connection wire of b) and the other electrical contact surface connected to said carrier body, mounted said sleeve, end bushing, and pin assembly are within said bore of said carrier body;
   e) a sun visor rod having a flat face mounted within said cylindrical detent sleeve and said cylindrical rod end bushing;
   f) a covering tape over the assembled rod mounting section to prevent plastic migration during over-molding of the carrier body; and
   g) a center support assembly comprising a body having an assembly mounting bore, a pair of electrical contact clips wherein each electrical contact clip is connected to the vehicles power system by means of an electrical wire attached thereto;

thereby providing a sun visor carrier body assembly with cooperating sun visor rod and sun visor center support assembly allowing for over-molding with a plastic to produce a finished sun visor having electrical provision for a vanity assembly incorporating electrical components.

10. The sun visor carrier assembly, rod, and center support as claimed in claim 9 wherein, said sun visor carrier body comprises metal.

11. The sun visor carrier assembly, rod, and center support as claimed in claim 9 wherein, said sun visor carrier body comprises plastic.

12. The sun visor carrier assembly, rod, and center support as claimed in claim 9 wherein, said detent clip comprises a metal.

13. The sun visor carrier assembly, rod, and center support as claimed in claim 9 wherein, said detent clip fastener device is a rivet.

14. The sun visor carrier assembly, rod, and center support as claimed in claim 9 wherein, said cylindrical detent sleeve, said rod end busing, said center support pin assembly body and said center support assembly body comprise a plastic.

15. The sun visor carrier assembly, rod, and center support as claimed in claim 9 wherein, said at least one fastener is a plurality of staples.

16. The sun visor carrier assembly, rod, and center support as claimed in claim 9 wherein, said at least one fastener is at least one sonic weld.

* * * * *